(12) United States Patent
Kishida

(10) Patent No.: US 6,674,393 B2
(45) Date of Patent: Jan. 6, 2004

(54) FM-CW RADAR PROCESSING DEVICE

(76) Inventor: Masayuki Kishida, c/o Fujitsu Ten Limited, 2-28, Gosho-dori 1-chome, Hyogo-ku, Kobe-shi, Hyogo 652-8510 (JP)

( * ) Notice: Subject to any disclaimer, the term of this patent is extended or adjusted under 35 U.S.C. 154(b) by 0 days.

(21) Appl. No.: 10/258,270

(22) PCT Filed: Feb. 6, 2002

(86) PCT No.: PCT/JP02/00988
§ 371 (c)(1),
(2), (4) Date: Oct. 22, 2002

(87) PCT Pub. No.: WO02/063337
PCT Pub. Date: Aug. 15, 2002

(65) Prior Publication Data
US 2003/0128156 A1 Jul. 10, 2003

(30) Foreign Application Priority Data
Feb. 6, 2001 (JP) ........................ 2001-030060

(51) Int. Cl.⁷ .............................................. G01S 13/38
(52) U.S. Cl. .................... 342/70; 342/109; 342/112; 342/115; 342/116; 342/130; 342/192; 342/196
(58) Field of Search .............................. 342/70, 71, 72, 342/82, 83, 98, 99, 107, 108, 109, 111, 112, 115, 116, 130, 131, 135, 192, 195, 196

(56) References Cited

U.S. PATENT DOCUMENTS

| | | | | |
|---|---|---|---|---|
| 5,731,778 A | * | 3/1998 | Nakatani et al. | 342/70 |
| 5,751,240 A | * | 5/1998 | Fujita et al. | 342/70 |
| 6,121,917 A | * | 9/2000 | Yamada | 342/128 |
| 6,317,073 B1 | * | 11/2001 | Tamatsu et al. | 342/70 |
| 6,429,804 B1 | * | 8/2002 | Kishida et al. | 342/70 |
| 6,573,859 B2 | * | 6/2003 | Tokoro | 342/70 |
| 2003/0048216 A1 | * | 3/2003 | Kishida | 342/70 |
| 2003/0122702 A1 | * | 7/2003 | Kishida et al. | 342/70 |
| 2003/0122703 A1 | * | 7/2003 | Kishida et al. | 342/70 |
| 2003/0128156 A1 | * | 7/2003 | Kishida | 342/195 |

* cited by examiner

Primary Examiner—John B. Sotomayor
(74) Attorney, Agent, or Firm—Fogg and Associates, LLC; Laura A. Ryan

(57) ABSTRACT

An FM-CW radar processing system pairs up peaks obtained by fast-Fourier transforming a beat signal occurring on an up portion and a down portion of a triangular-shaped FM-CW wave, calculates a distance or relative velocity with respect to a target object based on the peak signal in the up portion and the peak signal in the down portion obtained by the pairing, and compares the distance or relative velocity, obtained after changing the modulating signal for the FM-CW wave, with the distance or relative velocity obtained before changing the modulating signal. If the distance or relative velocity differs before and after changing the modulating signal, the pairing is judged to be mispairing.

5 Claims, 6 Drawing Sheets

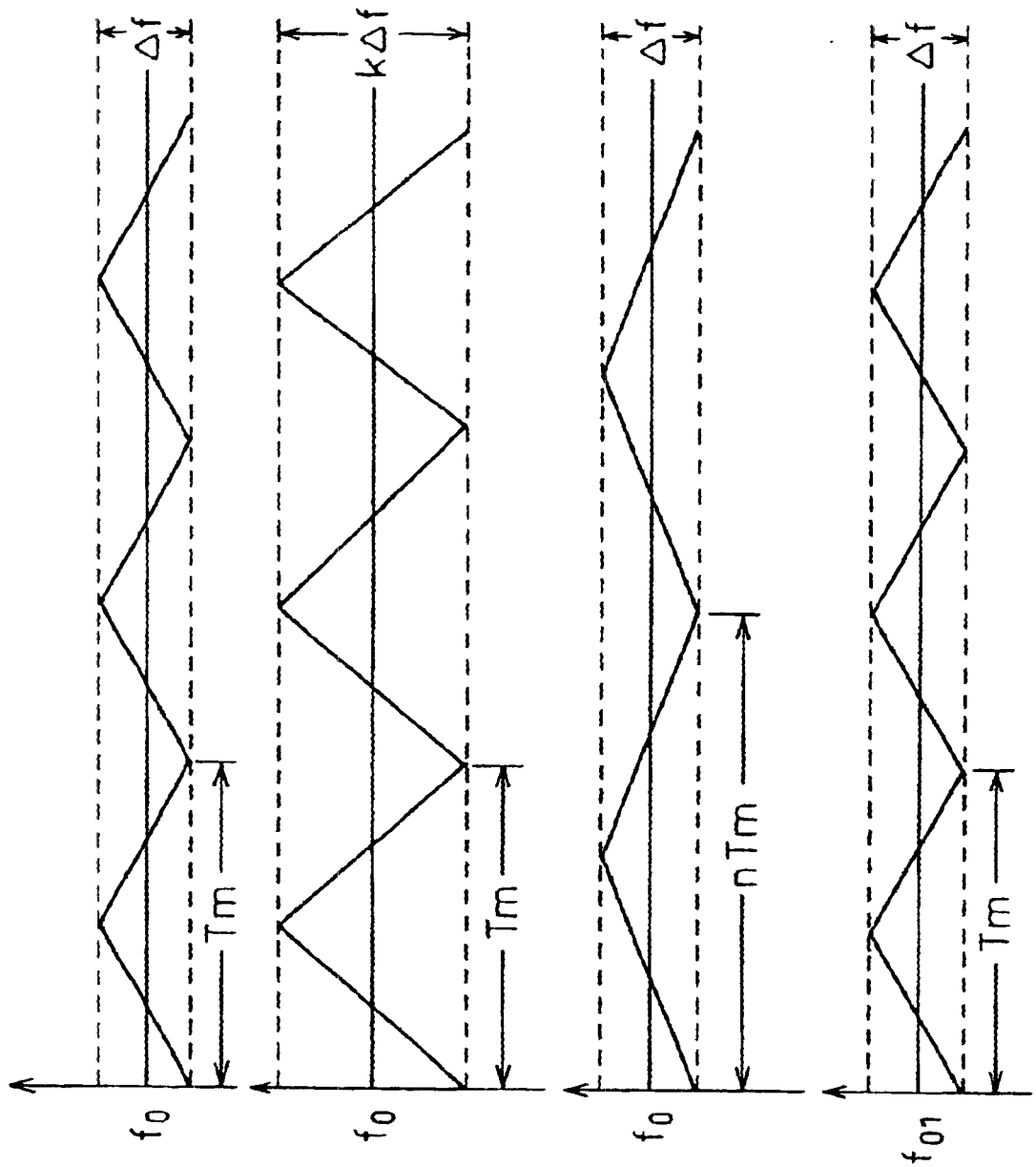

FM-CW RADAR PROCESSING DEVICE

TECHNICAL FIELD

The present invention relates to signal processing in a frequency-modulated continuous-wave (FM-CW) radar processing system and, more particularly, to a pairing process whereby peak signals occurring in relation to a target object, and obtained by frequency-analyzing a beat signal occurring between a received signal and a transmitted signal, are paired between an up portion and a down portion of a triangular-shaped FM-CW wave.

BACKGROUND ART

An FM-CW radar system is mounted on a vehicle or the like, and measures the distance or relative velocity of a target object, such as a vehicle traveling in front, by transmitting a triangular-shaped frequency-modulated continuous wave. More specifically, the transmitted wave from the radar is reflected by a vehicle traveling in front, and a beat signal (radar signal) occurring between the received signal of the reflected wave and the transmitted signal is obtained. This beat signal is fast-Fourier transformed (FFT) to analyze the frequency. The frequency-analyzed beat signal exhibits a peak at which the intensity becomes large corresponding to the target object. The peak frequency corresponding to this peak carries information concerning the distance, and the peak frequency differs between the up portion and down portion of the triangular FM-CW wave due to the Doppler effect associated with the relative velocity of the vehicle in front. The distance and relative velocity of the vehicle in front are determined from the peak frequencies in the up and down portions. If there is more than one vehicle traveling in front, one pair of peak frequencies, one in the up portion and the other in the down portion, occurs for each vehicle. Forming the pair of peak frequencies between the up portion and the down portion is called the pairing.

In an FM-CW radar processing system, a triangular wave is often used as the modulating signal; that is, a frequency-modulated wave, modulated with a triangular wave, is transmitted, and a reflected wave from a target object is received and the received signal is frequency-demodulated using the frequency-modulated wave as the local frequency. Here, the received wave from the target is shifted in frequency from the transmitted wave (i.e., produces a beat) according to the distance between the radar antenna and the target and also to the Doppler shift due to the relative velocity of the target. Therefore, the distance and the relative velocity of the target object can be measured from this frequency shift.

As described above, signal processing such as a fast Fourier transform is applied to the transmission/reception beat frequency by a CPU, and processing is performed to pair up the peak frequencies, based on which the distance and the relative velocity are determined.

In the prior art FM-CW radar processing system described above, the pairing is done by simply combining those close in peak frequency or close in peak intensity in the up portion and in the down portion of the triangular wave or, in the case of a scanning system or the like in which angle information is available, by combining those close in angle in the up portion and in the down portion.

However, if difficult conditions occur, for example, if a plurality of similarly reflecting target objects are present, simply pairing up the peak frequencies appearing in the up portion and the down portion may result in an erroneous combination.

For example, when peak A1 should be paired with peak D1 and peak B1 with peak C1, the peaks may not be paired up as expected. The prior art system, however, cannot detect the occurrence of such mispairing. If the distance and relative velocity are calculated without correcting the mispairing, the intended results cannot be obtained; specifically, an erroneous calculation of the relative velocity would pose a problem as it seriously affects control operations such as vehicle speed control.

In one method practiced to address this problem, the derivative of the distance is compared with the relative velocity and, if they match, it is determined that correct pairing has been done; otherwise, it is determined that mispairing has been done. With this method, however, if the relative speed of the target object is small, it takes time to judge the correctness of the pairing, and this also seriously affects control operations such as vehicle speed control.

DISCLOSURE OF THE INVENTION

It is accordingly an object of the present invention to solve the above problem and provide an FM-CW radar processing system which can transmit a radar wave by switching between two different modulation frequencies, triangular wave frequencies, or center frequencies and detect the occurrence of mispairing by comparing the results of the pairing.

To achieve the above object, the present invention proposes a pairing process for an FM-CW radar processing system as described below.

That is, according to the present invention, there is provided an FM-CW radar processing system which transmits an FM-CW wave and receives a reflected wave from a target object, comprising: modulating signal control means capable of changing a modulating signal to be applied to the FM-CW wave; pairing means for pairing peak signals obtained by fast-Fourier transforming a beat signal occurring on an up portion and a down portion of the FM-CW wave; calculating means for calculating a distance or relative velocity with respect to the target object, based on the peak signal in the up portion and the peak signal in the down portion obtained by the pairing; and comparing means for comparing the distance or relative velocity obtained by the calculating means after changing the modulating signal with the distance or relative velocity obtained before changing the modulating signal.

In the above processing system, when the comparing means has detected that the distance or relative velocity differs before and after changing the modulating signal, the pairing is judged to be mispairing.

The modulating signal control means changes a modulation frequency or frequency period for the modulating signal, and the calculating means calculates the distance to the target object after the change of the modulating signal; further, the modulating signal control means changes a center frequency for the modulating signal, and the calculating means calculates the relative velocity with respect to the target object after the change of the modulating signal.

BRIEF DESCRIPTION OF THE DRAWINGS

The present invention will be described below with reference to the accompanying drawings.

FIGS. 5A to 5D are diagrams showing specific examples of the triangular frequency-modulated waveforms used in the FM-CW radar processing system according to the present invention.

DETAILED DESCRIPTION OF THE INVENTION

First, for a better understanding of the effect achieved by the present invention, a description will be given of how pairing is performed in a conventional FM-CW radar processing system to which the present invention is not applied.

Figure 1:
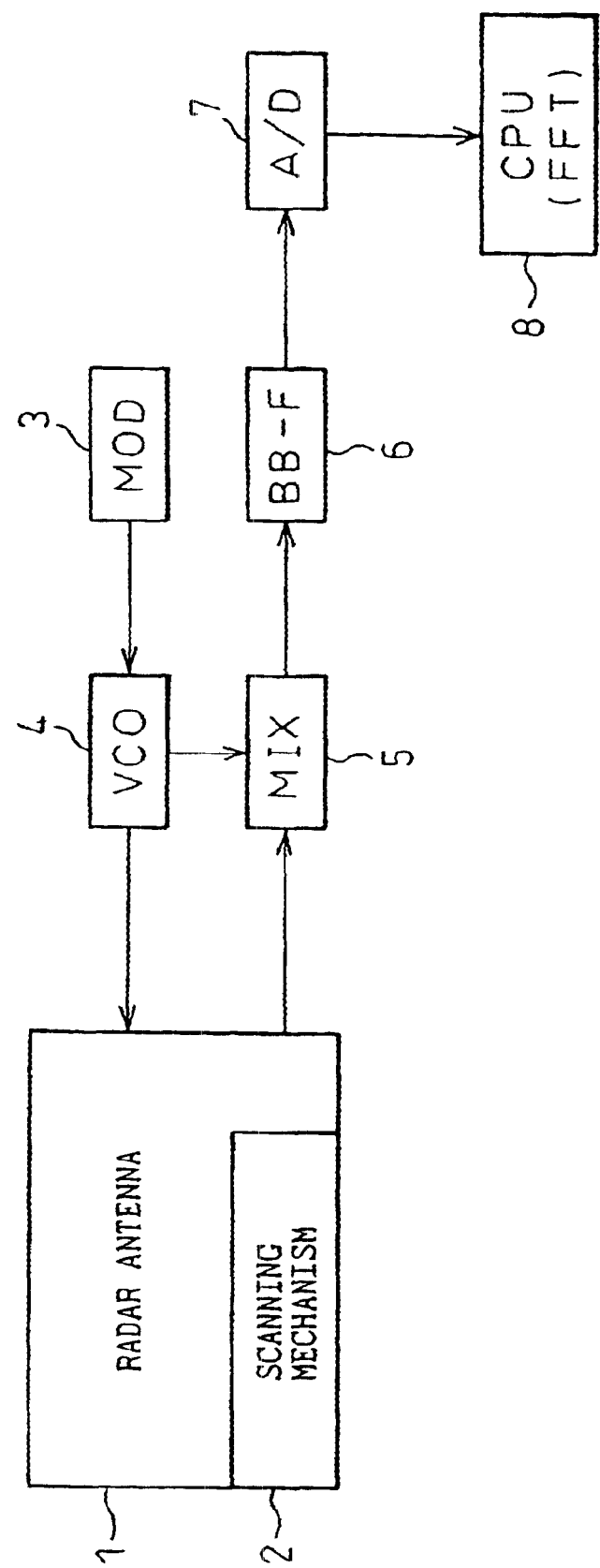
FIG. 1 is a diagram showing the configuration of a prior art FM-CW radar processing system.

FIG. 1 shows the configuration of the prior art FM-CW radar processing system. As shown, a modulating signal generator 3 applies a modulating signal to a voltage-controlled oscillator 4 for frequency modulation, and the frequency-modulated wave is transmitted via a radar antenna 1. On the other hand, a portion of the transmitted signal is separated and fed into a frequency converter 5 which functions as a mixer (MIX).

The signal reflected from a target object, such as a vehicle traveling in front, is received via the radar antenna 1, and the received signal is mixed in the frequency converter 5 with the output signal of the voltage-controlled oscillator 4 to produce a beat signal. The beat signal is passed through a baseband filter 6, and is converted by an A/D converter 7 into a digital signal; the digital signal is then supplied to a CPU 8 where signal processing, such as a fast Fourier transform, is applied to the digital signal to obtain the distance and relative velocity of the target object.

A single-antenna system or a two-antenna system can be employed for the radar antenna 1; in FIG. 1, an example of a scanning system is shown, so that the radar antenna 1 is equipped with a scanning mechanism 2. In the figure, the control unit for controlling the scanning mechanism 2 is not shown.

Figure 2A:
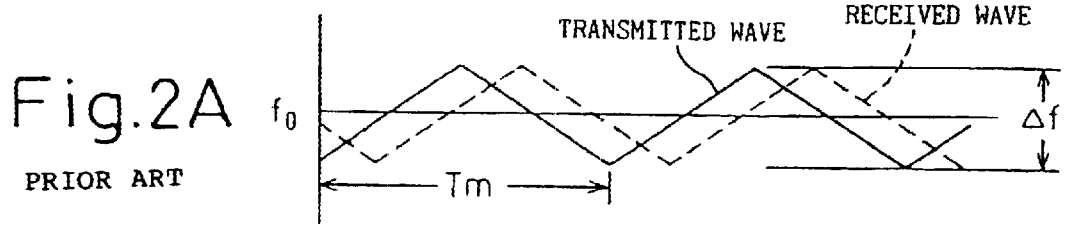
FIGS. 2A and 2B are diagrams for explaining the principle of the prior art FM-CW radar processing system.
Figure 2B:
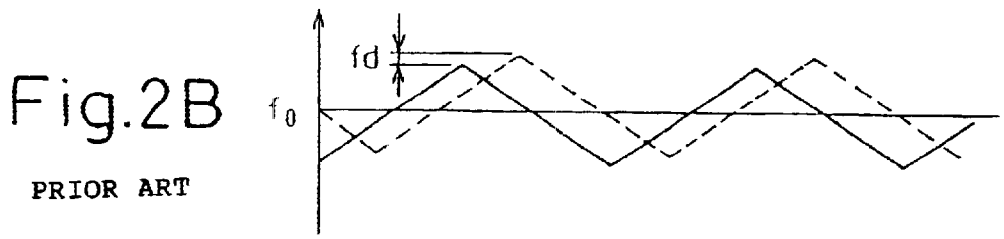

FIGS. 2A and 2B are diagrams each showing the relationship between the transmitted wave and the received wave in the above FM-CW radar processing system.

In the FM-CW radar processing system, a triangular wave is often used as the modulating signal, and the description given hereinafter deals with the case where a triangular wave is used as the modulating signal, but it will be appreciated that a modulating wave of another shape, such as a sawtooth wave or a trapezoidal wave, can be used instead of the triangular wave.

Frequency modulation with, for example, a triangular wave is applied, and the frequency-modulated wave is transmitted; then, a reflected wave from the target object is received, and the received wave is frequency-demodulated using the frequency-modulated wave as the local frequency.

Here, the received wave from the target is shifted in frequency from the transmitted wave (i.e., produces a beat) according to the distance between the radar antenna 1 and the target and also to the Doppler shift due to the relative velocity of the target. Therefore, the distance and the relative velocity of the target object can be measured from this frequency shift.

FIG. 2A shows the relationship between the transmitted wave and the received wave in the prior art FM-CW radar processing system when the relative velocity with respect to the target object is 0. The transmitted wave is shown by a solid line, and the received wave by a dashed line. In the figure, $f_0$ is the transmit center frequency of the transmitted wave, $\Delta f$ is the modulation frequency, and Tm is the repetition period. The frequency, fm, of the triangular wave is given by fm=1/Tm. The transmitted wave is reflected from the target object and received by the radar antenna 1; the received wave is shown by the dashed line in FIG. 2A. The round trip time T of the radio wave to and from the target object is given by T=2r/C, where r is the distance to the target object and C is the velocity of propagation of the radio wave.

Here, the received wave is shifted in frequency from the transmitted signal (i.e., produces a beat) according to the distance between the radar and the target object.

The beat frequency component fb can be expressed by the following equation.

$$fb=(4 \cdot \Delta f/C \cdot Tm)r \quad (1)$$

FIG. 2B, on the other hand, shows the relationship between the transmitted wave and the received wave in the prior art FM-CW radar processing system when the relative velocity with respect to the target object is v.

The transmitted wave shown by the solid line is reflected from the target object and received by the radar antenna 1; the received wave is shown by the dashed line. Here, the received wave is shifted in frequency from the transmitted wave signal (i.e., produces a beat) according to the distance between the radar system and the target object. In this case, as the relative velocity with respect to the target object is v, a Doppler shift occurs, and the beat frequency component fb can be expressed by the following equation.

$$fb=fr \pm fd=(4 \cdot \Delta f/C \cdot Tm)r \pm (2 \cdot f_0/C)v \quad (2)$$

In the above equations (1) and (2), the symbols have the following meanings.

fb: Transmission/reception beat frequency
fr: Range (distance) frequency
fd: Velocity frequency
$f_0$: Center frequency of transmitted wave
$\Delta f$: Modulation frequency
Tm: Period of modulation wave
C: Velocity of light (velocity of radio wave)
T: Round trip time of radio wave to and from target object
r: Range (distance) to target object
v: Relative velocity with respect to target object As described above, signal processing, such as a fast Fourier transform, is applied to the transmission/reception beat frequency by the CPU 8, and processing is performed to pair up the peak frequencies, based on which the distance and the relative velocity are determined.

In the FM-CW radar processing system described above, the pairing is done by simply combining those close in peak frequency or close in peak intensity between the up portion and the down portion of the triangular wave or, in the case of a scanning system or the like in which angle information is available, by combining those close in angle between the up portion and the down portion.

However, if difficult conditions occur, for example, if a plurality of similarly reflecting target objects are present, simply pairing up the peak frequencies appearing in the up portion and the down portion may result in an erroneous combination.

Figure 3A:
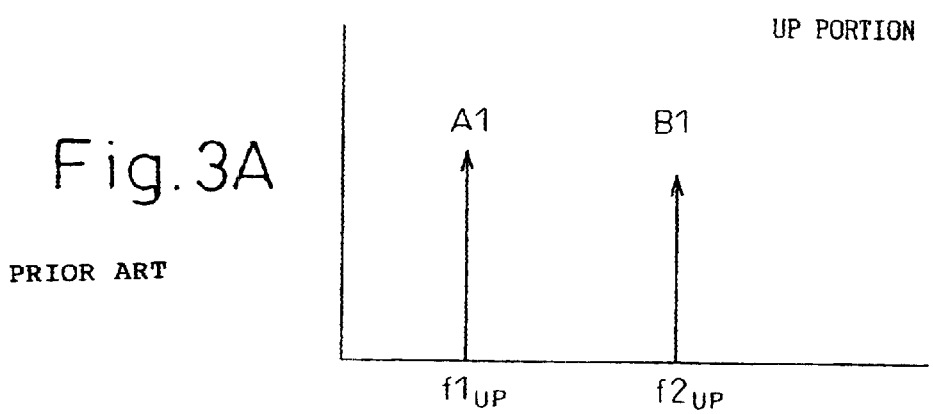
FIGS. 3A and 3B are diagrams for explaining how peak frequencies in an up portion are respectively paired with peak frequencies in a down portion in the prior art FM-CW radar processing system.
Figure 3B:
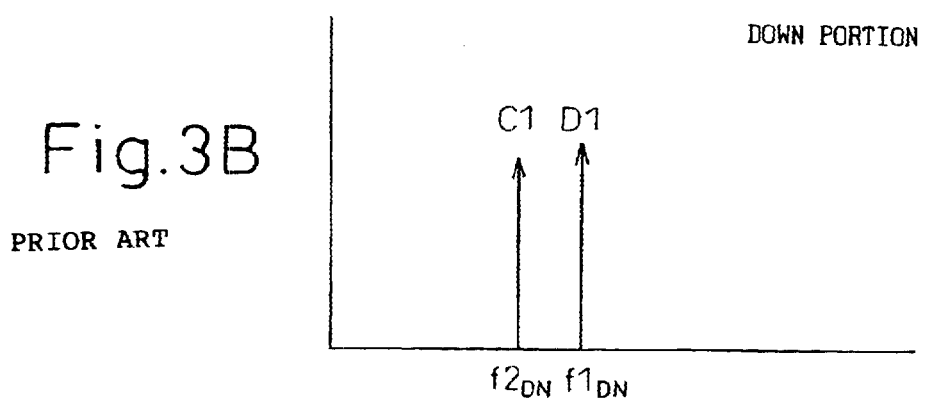

An outline of the above pairing process is shown in FIGS. 3A and 3B. FIG. 3A shows the frequency spectrum in the up portion of the triangular wave, and FIG. 3B shows the frequency spectrum in the down portion of the triangular wave.

As shown in FIG. 3A, two peaks A1 and B1 appear in the up portion; here, the peak frequencies are denoted by $f1_{UP}$ and $f2_{UP}$, respectively. On the other hand, in the down portion, peaks C1 and D1 corresponding to the above peaks appear at the positions of peak frequencies $f2_{DN}$ and $f1_{DN}$, respectively, as shown in FIG. 3B.

However, depending on conditions, when the peak frequency $f2_{DN}$ of the peak C1 in the down portion corresponding to the peak B1 is lower than the peak frequency of the peak D1 in the down portion corresponding to the peak A1, if the pairing of the peaks A1 and B1 with the peaks C1 and D1 is done in accordance with the above method, the peak A1 will be paired with the peak C1 and the peak B1 with the peak D1.

That is, erroneous pairing is done when the peak A1 should be paired with the peak D1 and the peak B1 with the peak C1. The prior art system, however, cannot detect the occurrence of this mispairing. If the distance and relative velocity are calculated without correcting the mispairing, the intended results cannot be obtained; specifically, an erroneous calculation of the relative velocity would pose a problem as it seriously affects control operations such as vehicle speed control.

In one method practiced to address this problem, the derivative of the distance is compared with the relative velocity, and if they match, it is determined that correct pairing is done; otherwise, it is determined that mispairing is done. With this method, however, if the relative speed of the target object is small, it takes time to judge the correctness of the pairing, and this also seriously affects control operations such as vehicle speed control.

To solve this problem, the FM-CW radar processing system of the present invention transmits a radar wave by switching between two different modulation frequencies, triangular wave frequencies, or center frequencies, and compares the results of the pairing, thereby achieving a pairing process that can detect the occurrence of mispairing.

An embodiment of the present invention that can perform such pairing will be described below with reference to the drawings.

When, for the peak frequencies of the peaks paired by the pairing, the peak frequency in the up portion is denoted by $f_{UP}$ and the peak frequency in the down portion by $f_{DN}$, then from the relation Tm=1/fm and the previously given equations (1) and (2) the distance r and the relative velocity v can be expressed as follows.

$$r = \{(f_{UP} + f_{DN})/2\}/(4 \cdot \Delta f \cdot fm/C) \quad (3)$$

$$v = \{(f_{UP} \pm f_{DN})\}/(2 \cdot f_0/C) \quad (4)$$

It can be seen here that, as the propagation speed C is known, the distance r and the relative velocity v can be determined based on the peak frequencies $f_{UP}$ and $f_{DN}$ if the modulation frequency $\Delta f$ and the triangular wave frequency fm are fixed values.

Noting the above equations (3) and (4), if the distance r or the relative velocity v is one obtained based on the reflected wave received from the same target object, then its value should remain unchanged even if the peak frequencies $f_{UP}$ and $f_{DN}$, the modulation frequency $\Delta f$, the triangular wave frequency fm, or the transmit wave center frequency $f_0$ change.

Utilizing this fact, in the present embodiment, an FM-CW wave is transmitted toward the same target object by changing the modulation frequency $\Delta f$, triangular wave frequency fm, or transmit wave center frequency $f_0$, and the value of the distance r or relative velocity v obtained based on the received reflected wave is compared with the corresponding value obtained based on the received wave before the change. If the values do not match, it is determined that mispairing is done; on the other hand, if they match, it is determined that correct pairing is done, and the calculated distance r and relative velocity v can thus be identified.

The peak frequencies $f_{UP}$ and $f_{DN}$ are determined by the sampling frequency of the A/D conversion, but changing the sampling frequency would require complicated processing; therefore, the sampling frequency is not changed in the present embodiment when judging the correctness of pairing.

Figure 4A:
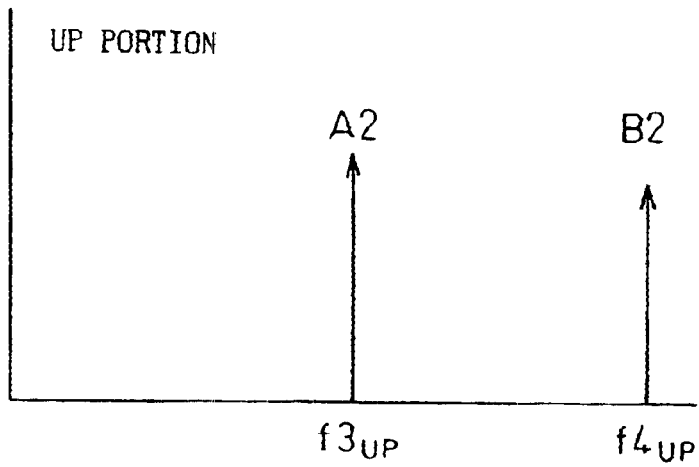
FIGS. 4A and 4B are diagrams for explaining how peak frequencies in the up portion are respectively paired with peak frequencies in the down portion in an FM-CW radar processing system according to the present invention.
Figure 4B:
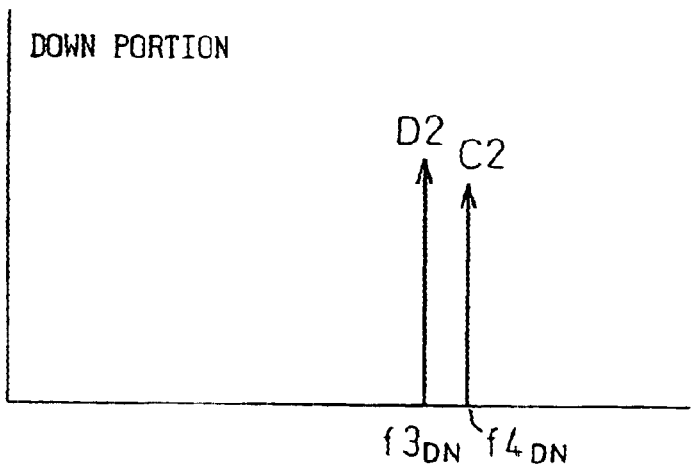

FIG. 4A shows the frequency spectrum in the up portion of the triangular wave, and FIG. 4B shows the frequency spectrum in the down portion of the triangular wave. Shown are the results obtained when an FM-CW wave is transmitted to the same target objects as those shown in FIGS. 3A and 3B by changing the modulation frequency $\Delta f$, triangular wave frequency fm, or transmit wave center frequency $f_0$ and the beat signal of the triangular wave was fast-Fourier transformed based on the reflected wave received from each target.

FIGS. 4A and 4B show an example in which the FM-CW wave is transmitted by changing the modulation frequency $\Delta f$; as shown, the resulting peak frequencies $f_{UP}$ and $f_{DN}$ are higher than those in FIGS. 3A and 3B obtained before the change.

Assuming that peaks A2 and B2 in FIG. 4A correspond to the peaks A1 and B1 in FIG. 3A, when the modulation frequency $\Delta f$ is changed, the way the peaks appear in the down portion differs depending on the target objects, as shown in FIG. 4B.

When pairing is done based on the rule that those close in peak frequency or those close in peak intensity are paired between the up and down portions of the triangular wave, as earlier described, in the case of FIGS. 4A and 4B the peak A2 is paired with the peak D2 and the peak B2 with the peak C2.

Subsequent to the pairing, the distance r and relative velocity v of each target object are calculated from the peak frequencies $f3_{UP}$ and $f3_{DN}$ or $f4_{UP}$ and $f4_{DN}$, based on the previously given equations (3) and (4), respectively.

The distance r calculated here is compared with the calculated result obtained in FIGS. 3A and 3B. If there is a variation in the value of the distance r, it is determined that mispairing is done. If the value of the distance r calculated here is the same as that obtained before the modulation frequency $\Delta f$ was changed, then it can be determined that correct pairing is done based on the reflected wave received from the same target object.

Though the above description has been given by specifically dealing with the case where the modulation frequency $\Delta f$ is changed, it will be recognized that when the triangular wave frequency fm is changed, mispairing can also be detected based on the variation of the calculated distance r in the same manner as when the modulation frequency Δf is changed; further, when the center frequency $f_0$ of the transmitted wave is changed, mispairing can likewise be detected based on the variation of the calculated relative velocity v.

FIGS. 5A to 5D show how the FM-CW wave to be transmitted from the radar antenna 1 is changed in order to judge whether mispairing has occurred or not.

FIG. 5A shows the FM-CW wave before it is changed. FIG. 5B shows the case in which the modulation frequency Δf of the FM-CW wave shown in FIG. 5A is multiplied by k, FIG. 5C shows the case in which the triangular wave frequency fm of the FM-CW wave is reduced, that is, the modulation wave period Tm is multiplied by n, and FIG. 5D shows the case in which the center frequency $f_0$ of the FM-CW wave is changed to $f_{01}$, for the case of a triangular wave.

Figure 6:
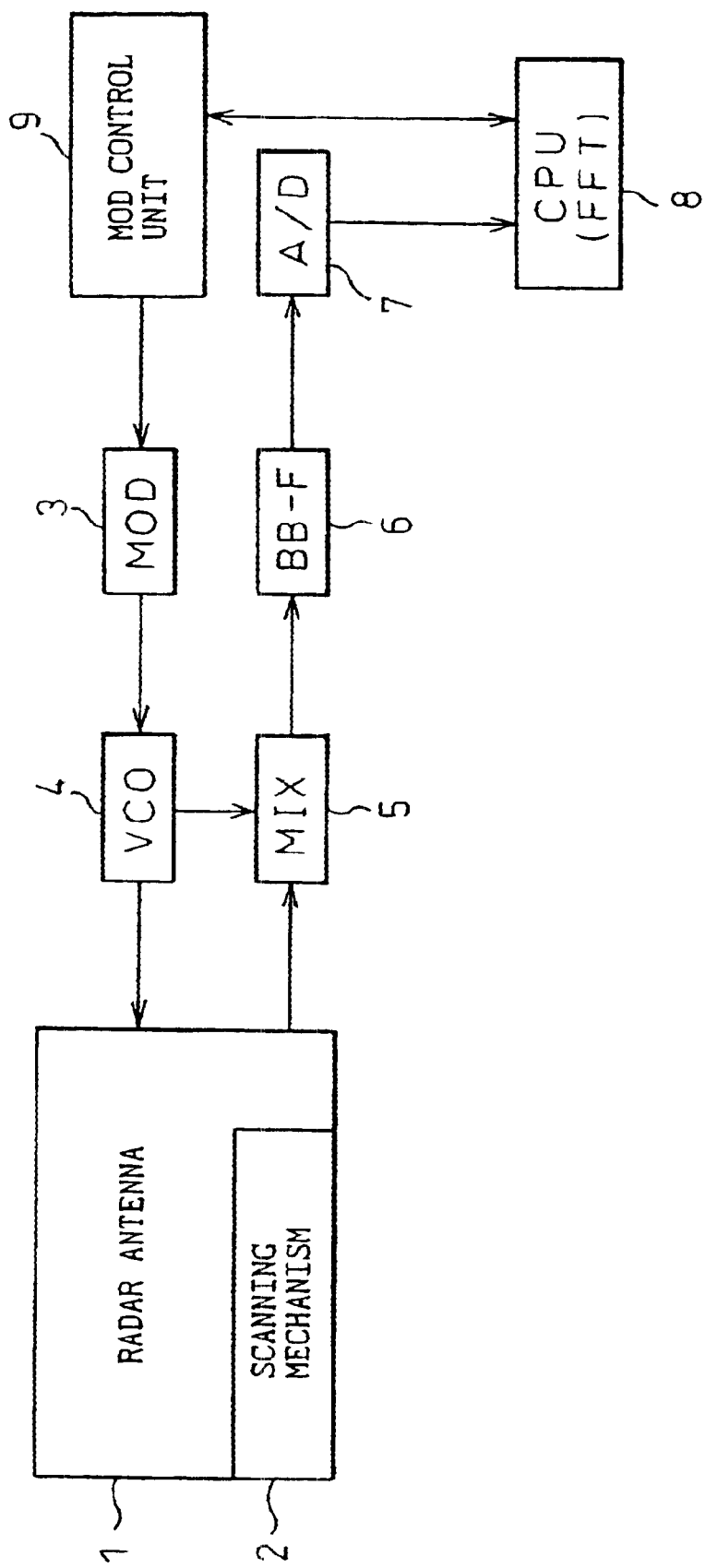
FIG. 6 is a diagram showing the configuration of the FM-CW radar processing system according to the present invention.

FIG. 6 shows the configuration of the FM-CW radar processing system that can transmit the FM-CW wave by changing the modulation frequency Δf, the triangular wave frequency fm, or the center frequency $f_0$.

The configuration of the FM-CW radar processing system shown in FIG. 6 differs from that of the prior art FM-CW radar processing system shown in FIG. 1 by the inclusion of a modulating signal generator control unit 9. Otherwise, the configuration is the same as that of the FM-CW radar processing system shown in FIG. 1, and the same components are designated by the same reference numerals as those in FIG. 1.

The modulating signal generator control unit 9 controls the modulating signal generator 3 in accordance with the timing directed by the CPU 8, and the FM-CW wave is transmitted from the radar antenna 1 by changing the modulation frequency Δf, triangular wave frequency fm, or transmit wave center frequency $f_0$ with that timing.

Next, the control and operation performed in the FM-CW radar processing system of the present embodiment will be described with reference to the flowchart of FIG. 7.

The control and operation procedure shown in the flowchart is performed primarily by the radar signal processing function of the CPU 8 shown in FIG. 6.

Figure 7:
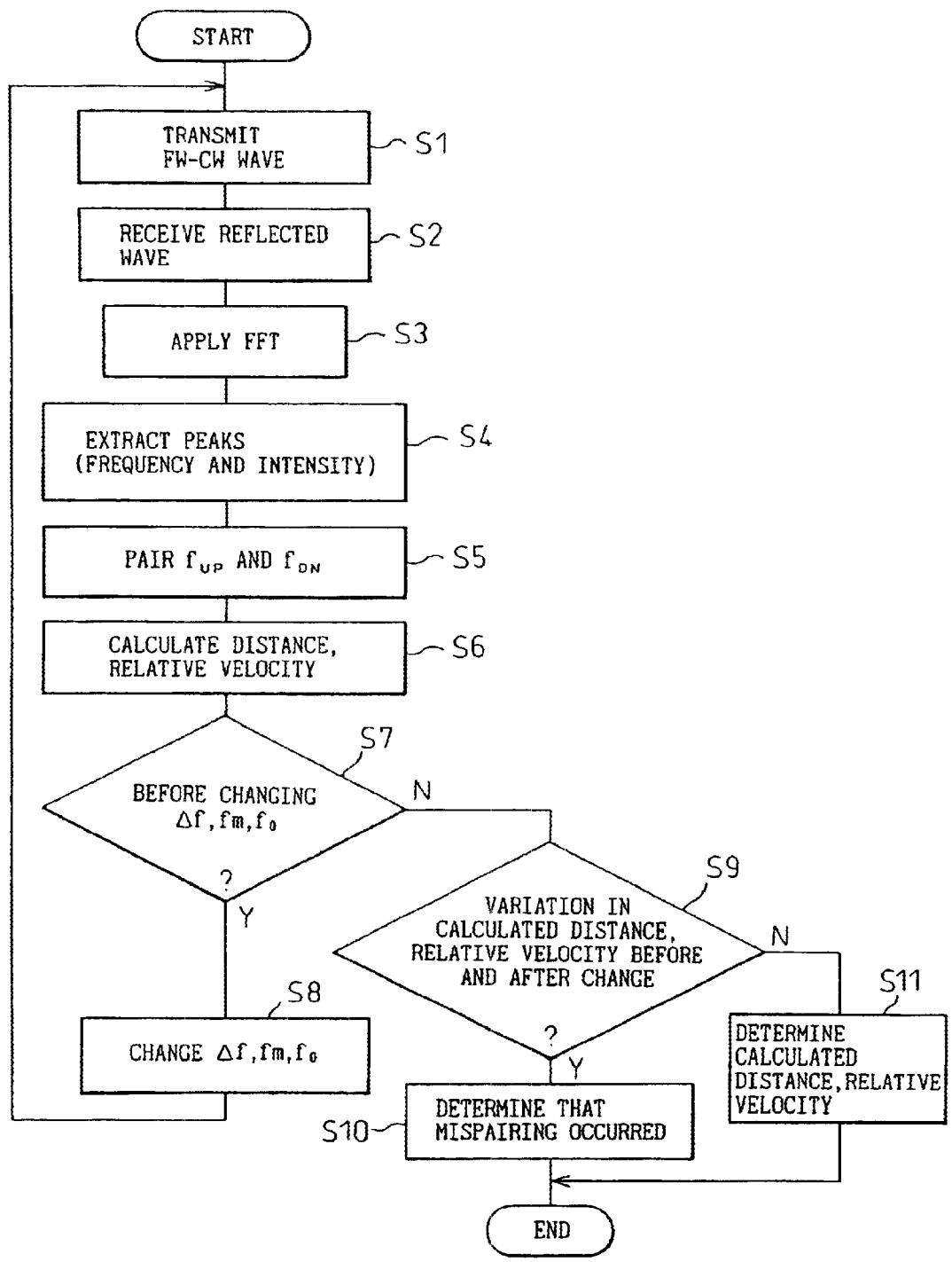
FIG. 7 is a diagram showing a flowchart for the control and operation of the pairing process performed in the FM-CW radar processing system according to the present invention.

In FIG. 7, upon initiation of the operation, the FM-CW wave, as a triangular wave having a prescribed modulation frequency Δf, triangular wave frequency fm, and transmit wave center frequency $f_0$, is transmitted from the radar antenna 1 toward a target object (step S1). Here, in the case of a scanning type FM-CW radar processing system, a plurality of FM-CW wave beams are projected over a prescribed angle range by means of the scanning mechanism 2. The angle of each beam is calculated here.

Next, the transmitted wave is reflected by a target object, and the reflected wave is received by the radar antenna 1 (step S2).

At this time, a beat signal is produced by the interference between the transmitted signal and the received signal, and this beat signal is processed by an FFT for the up portion and the down portion of each beam (step S3).

Then, from the peak data processed by an FFT, the peak frequency and its intensity are extracted for the up portion and the down portion of each beam (step S4).

Next, from each beam, frequency data close in frequency are grouped together for the up portion and the down portion, respectively, and the angle of each group is calculated. Then, the peaks to be paired between the up portion and the down portion are searched for, based on the angle, frequency, and intensity of each group. For the thus paired peaks, the peak frequency $f_{UP}$ in the up portion and the peak frequency $f_{DN}$ in the down portion are obtained (step S5).

Based on the thus obtained peak frequencies $f_{UP}$ and $f_{DN}$, distance r1 and relative velocity v1 are calculated from the previously given equations (3) and (4), and stored in memory (step S6).

It is then determined whether the distance r1 and relative velocity v1 calculated here are those obtained based on the FM-CW wave transmitted by changing the modulation frequency Δf, the triangular wave frequency fm, or the transmit wave center frequency $f_0$ (step S7).

Since the calculations here are done based on the FM-CW wave before it is changed (Y), the value of one of the modulation frequency Δf, the triangular wave frequency fm, and the transmit wave center frequency $f_0$ is changed (step S8), and the process returns to step S1 to transmit the FM-CW wave from the radar antenna 1 after changing the value of one of the modulation frequency Δf, the triangular wave frequency fm, and the transmit wave center frequency $f_0$.

The reflected wave received from the target object is processed in steps S2 to S5 in the same manner as the FM-CW wave was processed before it was changed, and distance r2 or relative velocity v2 is calculated. Here, either the distance r2 or the relative velocity v2 must be calculated. When calculating the relative velocity v2 here, only the value of the transmit wave center frequency $f_0$ should be changed in step S8.

Next, in step S7, it is determined whether the calculation done here is one based on the FM-CW wave before or after changing the modulation frequency Δf, the triangular wave frequency fm, or the transmit wave center frequency $f_0$; as it is based on the FM-CW wave after changing one of them (N), the values of the distance or relative velocity before and after the change are compared with each other, to detect any variation occurring between them (step S9).

For example, when the distance r1 calculated before the change is compared with the distance r2 calculated after the change, if r1≠r2 (Y), then it is determined that mispairing has occurred for the beam being tested (step S10).

On the other hand, if the result of the comparison shows r1=r2 (N), it is determined that correct pairing has been done for that beam, and the calculated values are taken as the distance and relative velocity of the target object (step S11). Then, the process proceeds to the next processing.

As described above, according to the FM-CW radar processing system of the present invention, the distance or relative velocity is recalculated based on the FM-CW wave changed by changing one of the modulation frequency Δf, the triangular wave frequency fm, and the transmit wave center frequency $f_0$, and is compared with the one calculated before the change, to detect any variation occurring between them; with this provision, it can be easily determined whether mispairing has occurred between the peak frequency in the up portion and the peak frequency in the down portion. Here, one of the components of the FM-CW wave need only be changed and, as the distance and relative velocity calculation function is one originally provided in the system, there is no need to provide a special configuration for the detection of mispairing.

What is claimed is:

1. An FM-CW radar processing system which transmits an FM-CW wave and receives a reflected wave from a target object, comprising:

a modulating signal generating unit capable of changing a modulating signal to be applied to said FM-CW wave;

a pairing unit for pairing peak signals between an up portion and a down portion of said FM-CW wave;

a calculating unit for calculating a distance or relative velocity with respect to said target object, based on the peak signal in said up portion and the peak signal in said down portion obtained by said pairing; and a comparing unit for comparing said distance or relative velocity, obtained by said calculating unit after changing said modulating signal, with said distance or relative velocity obtained before changing said modulating signal.

2. An FM-CW radar processing system which transmits an FM-CW wave and receives a reflected wave from a target object, comprising:

a modulating signal generating unit capable of changing a modulating signal to be applied to said FM-CW wave;

a pairing unit for pairing peak signals close in intensity between an up portion and a down portion of said FM-CW wave;

a calculating unit for calculating a distance or relative velocity with respect to said target object, based on the peak signal in said up portion and the peak signal in said down portion obtained by said pairing; and a comparing unit for comparing said distance or relative velocity, obtained by said calculating unit after changing said modulating signal, with said distance or relative velocity obtained before changing said modulating signal.

3. An FM-CW radar processing system as claimed in claim 1 or 2, wherein when said comparing unit has detected that said distance or relative velocity differs before and after changing said modulating signal, said pairing is judged to be mispairing.

4. An FM-CW radar processing system as claimed in claim 3, wherein said modulating signal generating unit changes a modulation frequency or frequency period for said modulating signal, and said calculating unit calculates the distance to said target object after said change of said modulating signal.

5. An FM-CW radar processing system as claimed in claim 3, wherein said modulating signal generating unit changes a center frequency for said modulating signal, and said calculating unit calculates the relative velocity with respect to said target object after said change of said modulating signal.

* * * * *

UNITED STATES PATENT AND TRADEMARK OFFICE
CERTIFICATE OF CORRECTION

PATENT NO. : 6,674,393 B2
DATED : January 6, 2004
INVENTOR(S) : Masayuki Kishida It is certified that error appears in the above-identified patent and that said Letters Patent is hereby corrected as shown below:

<u>Title page,</u>
Item [54], Title, please replace "FM-CW RADAR PROCESSING DEVICE" with
-- FM-CW RADAR PROCESSING SYSTEM --

Signed and Sealed this

Thirteenth Day of April, 2004

JON W. DUDAS
*Acting Director of the United States Patent and Trademark Office*